United States Patent
Valet

(10) Patent No.: US 6,676,999 B2
(45) Date of Patent: Jan. 13, 2004

(54) PROCESS FOR CURING A POLYMERIZABLE COMPOSITION

(75) Inventor: Andreas Valet, Binzen (DE)

(73) Assignee: Ciba Specialty Chemicals Corp., Tarrytown, NY (US)

(*) Notice: Subject to any disclaimer, the term of this patent is extended or adjusted under 35 U.S.C. 154(b) by 0 days.

(21) Appl. No.: 10/400,420

(22) Filed: Mar. 27, 2003

(65) Prior Publication Data

US 2003/0203986 A1 Oct. 30, 2003

Related U.S. Application Data

(62) Division of application No. 09/848,015, filed on May 3, 2001, which is a continuation of application No. 09/202,599, filed as application No. PCT/EP97/03219 on Jun. 20, 1997.

(30) Foreign Application Priority Data

Jul. 2, 1996 (EP) .............................................. 96810438

(51) Int. Cl.$^7$ .................................................. C08J 7/18
(52) U.S. Cl. ...................................................... 427/487
(58) Field of Search ................................ 427/508, 558, 427/559, 385.5

Primary Examiner—Bernard Pianalto
(74) Attorney, Agent, or Firm—Tyler A. Stevenson

(57) ABSTRACT

By of means of a curing process combining thermal and UV curing it is possible, using compositons comprising (A) a coating system based on a polyacrylate polyol or polyester polyol with melamine, or a polyacrylate polyol and/or polyester with a blocked or unblocked polyisocyanate, or a carboxyl-, anhydride- or amino-functional polyester and/or polyacrylate with an epoxy-functional polyester or polyacrylate, (B) an OH, $NH_2$-, COOH-, Epoxy- or NCO-functional resin containing, in addition, at least one ethylenically unsaturated double bond, which is separated from the functional group by a spacer group, and (C) at least one photoinitiator, to obtain coatings having good surface properties.

7 Claims, No Drawings

PROCESS FOR CURING A POLYMERIZABLE COMPOSITION

This is a divisional of application Ser. No. 09/848,015, filed May 3, 2001, which is a continuation of application Ser. No. 09/202,599, filed Dec. 17, 1998, which is a 371 of PCT/EP 97/03219, filed Jun. 20, 1997.

The invention relates to a process for the curing of surface coatings, whereby the surface hardness of the cured surface coating is increased by means of irradiation with UV light, and to a polymerisable composition.

In U.S. Pat. No. 4,121,985 the resistance of thermoplastic polyurethane surfaces to solvents and abrasion is improved by treatment of the surface with a mixture of solvent and photo-initiator and by subsequent irradiation with UV light. Derwent No. 94-252879/31 (JP-A Hei 6 184267) describes a polyurethane resin obtained by reacting polyol mixtures, containing chlorinated polyols and polyols having COOH groups, with polyisocyanates and unsaturated monohydroxy compounds and, where appropriate, a photoinitiator. DE-A 42 37 695 claims surface-coating compositions that contain functionalised resins having α,β-unsaturated groups and that are cured thermally. Derwent No. 87-331357 (JP-A Sho 62 236867) describes a curing process combining thermal and photochemical curing. Derwent No. 85-188037 (JP-A Sho 60 118271) discloses a combined heat- and UV-curable composition. EP-A 600 262 claims photoresist compositions having heat- and UV-curable components. In DE-A 33 32 004 and EP-A 247 563 there are prepared UV-curable surface-coating systems that comprise epoxide/amine- or polyol/isocyanate-based resins.

In the art there is a need for resins for coatings and surface coatings that exhibit good properties especially in respect of the durability of the cured surface.

It has now been found, surprisingly, that coatings having very good surface properties can be obtained by means of a process for the curing of a polymerisable composition comprising (A) a coating system based on
  (I) a polyacrylate polyol and/or polyester polyol with melamine or
  (II) a polyacrylate polyol and/or polyester polyol with a blocked or unblocked polyisocyanate or
  (III) a carboxyl-, anhydride- or amino-functional polyester and/or polyacrylate with an epoxy-functional polyester or polyacrylate, or
  (IV) a mixture of (I), (II), (III) and/or (IV),
(B) an OH—, NH$_2$—, COOH—, epoxy- or NCO-functional resin containing, in addition, at least one ethylenically unsaturated double bond, it being necessary for a spacer group of at least 4 linearly linked atoms to be present between the double bond and the functional group,
wherein components (A) and (B) do not contain halogen, and
(C) at least one photoinitiator,
by thermal treatment and, for the purpose of improving the surface properties, subsequent photochemical treatment with light of a wavelength from 200 to 600 nm.

The invention relates also to a composition comprising
(A) a coating system based on
  (I) a polyacrylate polyol and/or polyester polyol with melamine or
  (II) a polyacrylate polyol and/or polyester polyol with a blocked or unblocked polyisocyanate or
  (III) a carboxyl-, anhydride- or amino-functional polyester and/or polyacrylate with an epoxy-functional polyester or polyacrylate, or
  (IV) a mixture of (I), (II), (III) and/or (IV),
(B) an OH—, NH$_2$—, COOH—, epoxy- or NCO-functional resin containing, in addition, at least one ethylenically unsaturated double bond, it being necessary for a spacer group of at least 4 linearly linked atoms to be present between the double bond and the functional group,
wherein components (A) and (B) do not contain halogen, and
(C) at least one photoinitiator.

Constituents of component (A) are, for example, surface-coating or coating-system constituents that are customary in the art. In the context of the present invention, component (A) represents a surface coating or a coating.

Constituents of component (A) are, for example, polymers that are derived from α,β-unsaturated acids or from derivatives thereof. Examples thereof are polyacrylates and polymethacrylates, polymethylmethacrylates impact-resistant modified with butyl acrylate, polyacrylamides and polyacrylonitriles. Also of interest are, for example, silicone acrylates. Further constituents of component (A) may be polyurethanes that are derived on the one hand from polyethers, polyesters and polyacrylates having free hydroxy groups and on the other hand from aliphatic or aromatic polyisocyanates, and precursors thereof. The constituents of component (A) also include, for example, cross-linkable acrylic resins that are derived from substituted acrylic acid esters, for example epoxy acrylates, urethane acrylates or polyester acrylates. Furthermore, alkyd resins, polyester resins and acrylate resins, and modifications thereof, that are cross-linked with melamine resins, urea resins, isocyanates, isocyanurates, polyisocyanates, polyisocyanurates or epoxy resins may be a constituent of component (A).

Component (A) is, for example, generally a film-forming binder based on a thermoplastic or thermocurable resin, predominantly on a thermocurable resin. Examples thereof are alkyd, acrylic, polyester, phenol, melamine, epoxy and polyurethane resins and mixtures thereof. Examples thereof are described, for example, in Ullmann's Encyclopedia of Industrial Chemistry, 5th Ed., Vol. A18, pp. 368–426, VCH, Weinheim 1991.

Component (A) may be a cold-curable or hot-curable binder, with the addition of a curing catalyst possibly being advantageous. Suitable catalysts that accelerate the full cure of the binder are described, for example, in Ullmann's Encyclopedia of Industrial Chemistry, Vol. A18, p. 469, VCH Verlagsgesellschaft, Weinheim 1991.

Examples of coatings (A) with specific binders are:
1. surface coatings based on cold- or hot-cross-linkable alkyd, acrylate, polyester, epoxy or melamine resins or mixtures of such resins, where appropriate with the addition of a curing catalyst;
2. two-component polyurethane surface coatings based on hydroxy-group-containing acrylate, polyester or polyether resins and aliphatic or aromatic isocyanates, isocyanurates or polyisocyanates;
3. one-component polyurethane surface coatings based on blocked isocyanates, isocyanurates or polyisocyanates that are de-blocked during stoving; if desired, the addition of melamine resins is also possible;
4. one-component polyurethane surface coatings based on aliphatic or aromatic urethanes or polyurethanes and hydroxy-group-containing acrylate, polyester or polyether resins;
5. one-component polyurethane surface coatings based on aliphatic or aromatic urethane acrylates or polyurethane acrylates having free amine groups in the urethane structure and melamine resins or polyether resins, where appropriate with the addition of a curing catalyst;

6. two-component surface coatings based on (poly) ketimines and aliphatic or aromatic isocyanates, isocyanurates or polyisocyanates;
7. two-component surface coatings based on (poly) ketimines and an unsaturated acrylate resin or a polyacetoacetate resin or a methacrylamidoglycolate methyl ester;
8. two-component surface coatings based on carboxyl-group- or amino-group-containing polyacrylates and polyepoxides;
9. two-component surface coatings based on anhydride-group-containing acrylate resins and a polyhydroxy or polyamino component;
10. two-component surface coatings based on acrylate-containing anhydrides and poly-epoxides;
11. two-component surface coatings based on (poly) oxazolines and anhydride-group-containing acrylate resins or unsaturated acrylate resins or aliphatic or aromatic isocyanates, isocyanurates or polyisocyanates;
12. two-component surface coatings based on unsaturated polyacrylates and polymalonates;
13. thermoplastic polyacrylate surface coatings based on thermoplastic acrylate resins or extrinsically cross-linking acrylate resins in combination with etherified melamine resins;

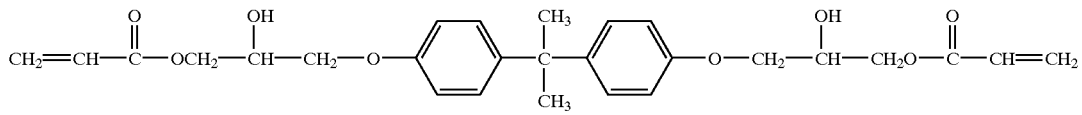

14. surface-coating systems based on siloxane-modified acrylate resins.

Blocked isocyanates as may be used in component (A) are described, for example, in Organischer Metallschutz: Entwicklung und Anwendung von Beschichtungsstoffen, pp. 159–160, Vincentz Verlag, Hannover (1993). Such compounds are those wherein the highly reactive NCO group is "blocked" by reaction with specific radicals, for example, primary alcohols, phenol, ethyl acetoacetate, ε-caprolactam, phthalimide, imidazole, oxime and amine. The blocked isocyanate is stable in liquid systems and also in the presence of hydroxy groups. On heating, the blocking agents are removed again and the NCO group is freed.

1-component (1C) and 2-component (2C) systems are described, for example, in Ullmann's Encyclopedia of Industrial Chemistry, Vol. A18, Paints and Coatings, pp. 404–407, VCH Verlagsgesellschaft mbH, Weinheim (1991).

It is possible to optimise the composition by specially adapting the formulation, for example by varying the binder/cross-linker ratio. The person skilled in the art of surface-coating technology will be familiar with such measures.

In the curing process according to the invention the composition is preferably a composition based on acrylate/melamine, 2-component polyurethane, 1-component polyurethane, 2-component epoxy or 1-component epoxy/carboxy. Mixtures of those systems are also possible, for example the addition of melamine to 1-component polyurethanes.

Component (A) is preferably a binder based on a polyacrylate with melamine. Preference is given also to a system based on a polyacrylate polyol and/or polyester polyol with an unblocked polyisocyanate.

Component (B) consists essentially of monomeric and/or oligomeric compounds having ethylenically unsaturated bonds (pre-polymers) that, in addition, contain at least one or more OH, $NH_2$, COOH, epoxy or NCO groups capable of reacting with the binder and/or cross-linker of component (A). After application and thermal curing, the ethylenically unsaturated bonds are converted into a cross-linked, high-molecular-weight form by means of UV radiation. Examples of component (B) are described, for example, in the publication mentioned hereinbefore, Ullmann's Encyclopedia of Industrial Chemistry, 5th Ed., Vol. A18, pp. 451–453, or by S. Urano, K. Aoki, N. Tsuboniva and R. Mizuguchi in Progress in Organic Coatings, 20 (1992), 471–486, or by H. Terashima and O. Isozaki in JOCCA 1992 (6), 222. (B) may be, for example, an OH-group-containing, unsaturated acrylate, for example hydroxyethyl acrylate, hydroxybutyl acrylate or a glycidyl acrylate. Component (B) may have any desired structure (for example it may contain units of polyester, polyacrylate, polyether, etc.) provided that it includes an ethylenically unsaturated double bond and also, in addition, free OH, COOH, $NH_2$, epoxy or NCO groups.

(B) may also be obtained, for example, by reacting an epoxy-functional oligomer with acrylic acid or methacrylic acid.

A typical example of an OH-functional oligomer having vinylic double bonds is obtained by reaction of $CH_2$=CHCOOH with

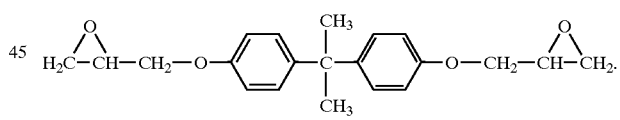

A further possible method of preparing component (B) is, for example, the reaction of an oligomer that contains only one epoxy group and has a free OH group in another position in the molecule.

Also suitable as component (B) are, for example, siloxane-group-containing polymers that contain free OH groups and, in addition, free double bonds. Those polymers can be obtained, for example, by reacting an epoxy-functional polysiloxane with acrylic acid or methacrylic acid or derivatives thereof, for example $CH_2$=CHCOO—$CH_2CH(OH)CH_2O$—$(CH_2)_m$—$[Si(CH_3)_2$—$O]_n$—$Si(CH_3)_2$—$(CH_2)_m$—$OCH_2CH(OH)CH_2OC(O)CH$=$CH_2$. Such products are available commercially.

Suitable spacer groups of at least 4 linearly linked atoms positioned between the double bond and the functional group in component (B) are, for example, the following structures:

—$(CH_2)_y$—, wherein $y \geq 4$, or

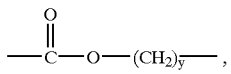

wherein $y \geq 2$, or

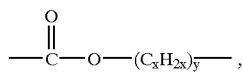

wherein
x=from 1 to 3 and $y \geq 2$. Preference is given to

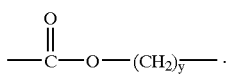

The number of spacer atoms is at least 4, for example from 4 to 16, 6–16, preferably from 4 to 12.

The compositions contain, for example, from 1 to 50%, e.g. from 5 to 30%, especially from 10 to 25%, component (B), based on 100 parts of component (A).

According to the invention there may be used as photoinitiator (C) any known compound that is capable of initiating radical polymerisation when irradiated with light.

Examples thereof are: benzophenone, benzophenone derivatives, acetophenone, acetophenone derivatives, for example 1-hydroxy-cyclohexyl-phenyl ketone, 1-[4-(2-hydroxyethoxy)-phenyl]-2-hydroxy-2-methyl-1-propan-1-one or 2-hydroxy-2-methyl-1-phenyl-propanone, dialkoxyacetophenones, α-hydroxy- or α-amino-acetophenones, for example (4-morpholino-benzoyl)-1-benzyl-1-di-methylamino-propane or (4-methylthiobenzoyl)-1-methyl-1-morpholino-ethane, 4-aroyl-1,3-dioxolanes, benzoin alkyl ethers and benzil ketals, for example 2,2-dimethoxy-1,2-diphenylethan-1-one, monoacylphosphine oxides, for example 2,4,6-trimethylbenzoyl-diphenyl-phosphine oxide, bisacylphosphine oxides, for example bis(2,6-dimethoxybenzoyl)-2,4,4-trimethylpentyl-phosphine oxide, bis(2,4,6-trimethylbenzoyl)-(2-methylprop-1-yl)-phosphine oxide, bis(2,4,6-trimethylbenzoyl)phenyl-phosphine oxide and trisacylphosphine oxides. In certain cases it may be advantageous to use mixtures of two or more photoinitiators, for example mixtures of bis(2,6-dimethoxybenzoyl)-2,4,4-trimethylpentyl-phosphine oxide or bis(2,4,6-trimethylbenzoyl)-phenyl-phosphine oxide with 1-hydroxy-cyclohexyl-phenyl ketone or hydroxy-2-methyl-1-phenyl-propanone or 2-methoxy-1-phenyl-ethane-1,2dione.

Component (C) is preferably a compound of formula I

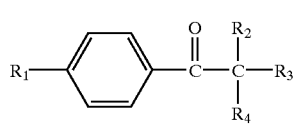

wherein
$R_1$ is hydrogen, $C_1$–$C_{18}$alkyl, $C_1$–$C_{18}$alkoxy, —$OCH_2CH_2$—$OR_5$, a group

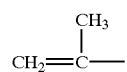

or a group

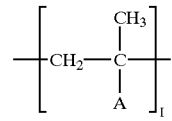

wherein
I is an integer from 2 to 10 and
A is a radical

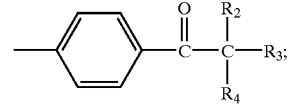

$R_2$ and $R_3$ are each independently of the other hydrogen, $C_1$–$C_6$alkyl, phenyl, $C_1$–$C_{16}$alkoxy, $OSiR_6R_7R_8$ or —$O(CH_2CH_2O)_q$—$C_1$–$C_{16}$alkyl wherein
q is an integer from 1 to 20, or
$R_2$ and $R_3$, together with the carbon atom to which they are bonded, form a cyclohexyl ring;
$R_4$ is hydroxy, $C_1$–$C_{16}$alkoxy or —$O(CH_2CH_2O)_q$—$C_1$–$C_{16}$alkyl;
with the proviso that $R_2$, $R_3$ and $R_4$ are not all simultaneously $C_1$–$C_{16}$alkoxy or —$O(CH_2CH_2O)_q$—$C_1$–$C_{16}$alkyl;
$R_5$ is hydrogen, $C_1$–$C_8$alkyl,

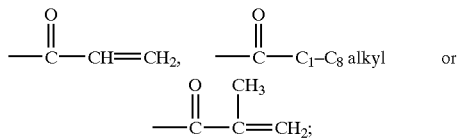

$R_6$, $R_7$ and $R_8$ are each independently of the others $C_1$–$C_4$alkyl or phenyl;
or a compound of formula (Ia)

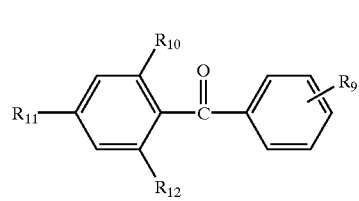

(Ia)

wherein
$R_9$, $R_{10}$, $R_{11}$ and $R_{12}$ are each independently of the others hydrogen, methyl, phenyl, methoxy, —COOH, unsubstituted or $C_1$–$C_4$alkyl-substituted phenyl, or a group —$OCH_2CH_2OR_5$ or —$SCH_2CH_2OR_5$ wherein $R_5$ is as defined for formula I;
or a compound of formula (Ib)

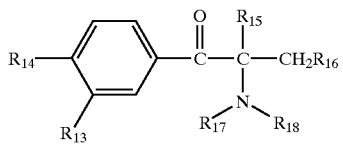

(Ib)

wherein
$R_{13}$ is hydrogen, $C_1$–$C_4$alkyl, $C_1$–$C_4$alkoxy, $C_1$–$C_4$alkylthio, halogen or a group $N(R_{17})_2$;
$R_{14}$ has one of the meanings indicated for $R_{13}$ or is the group

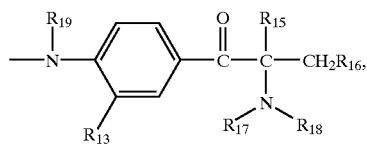

in which case the radical $R_{13}$ from formula Ib and the radical $R_{13}$ from this group are together a direct bond and the other radicals are as defined below;
$R_{15}$ is $C_1$–$C_8$alkyl;
$R_{16}$ is hydrogen, —CH=CHR$_{20}$, or phenyl that is unsubstituted or mono- to tri-substituted by $C_1$–$C_{12}$alkyl, $C_1$–$C_4$alkoxy or by halogen; or
$R_{15}$ and $R_{16}$, together with the carbon atom to which they are bonded, form a cyclohexyl ring;
$R_{17}$ and $R_{18}$ are each independently of the other $C_1$–$C_4$alkyl or
$R_{17}$ and $R_{18}$, together with the nitrogen atom to which they are bonded, form a five- or six-membered, saturated or unsaturated ring, which may be interrupted by —O—, —NH— or by —N(CH$_3$)—,
$R_{19}$ is hydrogen or $C_1$–$C_{12}$alkyl; and
$R_{20}$ is hydrogen or $C_1$–$C_4$-alkyl;
or a compound of formula II

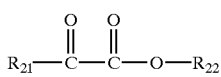

(II)

wherein
$R_{21}$ is naphthyl, anthracyl, an O- or S-containing, 5- or 6-membered heterocyclic ring or a group

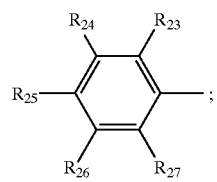

$R_{22}$ is $C_1$–$C_{12}$alkyl, cyclohexyl, cyclopentyl, $C_2$–$C_{12}$alkenyl, phenyl-$C_1$–$C_4$alkyl; phenyl, biphenyl or naphthyl each of which is unsubstituted or mono- to tetra-substituted by $C_1$–$C_4$alkyl and/or by $C_1$–$C_4$alkoxy; $C_2$–$C_{18}$alkyl interrupted one or more times by —O—; or $Si(R_{28})(R_{29})(R_{30})$;

$R_{23}$, $R_{24}$, $R_{25}$, $R_{26}$ and $R_{27}$ are each independently of the others hydrogen, $C_1$–$C_8$alkyl, $C_1$–$C_8$alkoxy, $C_1$–$C_8$alkylthio, phenyloxy, phenylthio, phenyl that is unsubstituted or mono- to tetra-substituted by $C_1$–$C_4$alkyl and/or by $C_1$–$C_4$alkoxy, phenyl-$C_1$–$C_4$alkyl, halogen or NO$_2$;
$R_{28}$, $R_{29}$ and $R_{30}$ are each independently of the others $C_1$–$C_8$alkyl, cyclohexyl, cyclopentyl, phenyl or $C_1$–$C_8$alkoxy;
or a compound of formula III

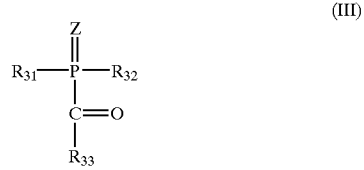

(III)

wherein
Z is S or O;
$R_{31}$ and $R_{32}$ are each independently of the other $C_1$–$C_{18}$alkyl, $C_2$–$C_{18}$alkyl interrupted one or more times by —O—, phenyl-substituted $C_1$–$C_4$alkyl, $C_2$–$C_4$alkenyl; phenyl, naphthyl or biphenyl each of which is unsubstituted or mono- to penta-substituted by halogen, hydroxy, $C_1$–$C_8$alkyl and/or by $C_1$–$C_8$alkoxy; $C_5$–$C_{12}$cycloalkyl, an O-, S- or N-containing, 5- or 6-membered heterocyclic ring, or a group COR$_{33}$, or
$R_{31}$ is a radical

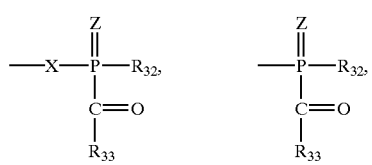

OH, OR$_{34}$, O$^-$NH$_4^+$ or O$^-$[M$^{n+}$]$_{1/n}$ wherein
n is an integer from 1 to 3 and
M is an n-valent metal ion, or
$R_{31}$ and $R_{32}$ together are $C_4$–$C_7$alkylene and form a ring together with the P atom to which they are bonded;
$R_{33}$ is $C_1$–$C_{12}$alkyl, $C_3$–$C_{12}$cycloalkyl, $C_2$–$C_{18}$alkenyl; phenyl, naphthyl or biphenyl each of which is unsubstituted or mono- to tetra-substituted by $C_1$–$C_8$alkyl, $C_1$–$C_8$alkoxy, $C_1$–$C_8$alkylthio and/or by halogen; an O-, S- or N-containing, 5- or 6-membered heterocyclic ring, or a group

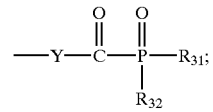

$R_{34}$ is $C_1$–$C_8$alkyl, phenyl, naphthyl, $C_1$–$C_8$alkylphenyl or $C_1$–$C_4$alkylnaphthyl;
Y is phenylene, $C_1$–$C_{12}$alkylene or $C_5$–$C_6$cycloalkylene;
X is $C_1$–$C_{18}$alkylene, $C_2$–$C_{18}$alkylene interrupted one or more times by —O—, —S—, —NR$_{35}$—, P(O)R$_{36}$— or by —SO$_2$—, or $C_1$–$C_6$alkylene substituted by Cl, F, $C_1$–$C_4$alkoxy, COOR$_{37}$, phenyl, phenyl-$C_1$–$C_4$alkyl, naphthyl-$C_1$–$C_4$alkyl, $C_1$–$C_4$alkylphenyl, $C_1$–$C_4$alkylnaphthyl, phenyl-$C_1$–$C_4$alkoxy, naphthyl-$C_1$–$C_4$alkoxy and/or by CN, or X is $C_1$–$C_8$alkylene substituted by one or two radicals of formula A

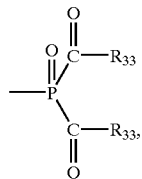
(A)

or

X is a group of formula $A_1$–$A_9$

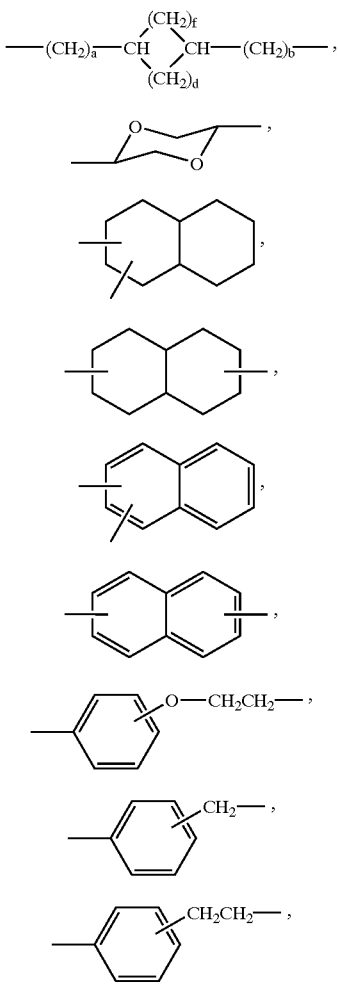

(A₁), (A₂), (A₃), (A₄), (A₅), (A₆), (A₇), (A₈), (A₉)

wherein a and b are each independently of the other 0 or 1, and the sum of d and f is an integer from 3 to 8, with the proviso that neither d nor f is 0, or X is a group —$CH_2$—CH=CH—$CH_2$— or —$CH_2$—C≡C—$CH_2$—, or X is phenylene, xylyene

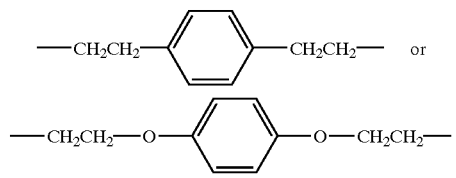

each of which is unsubstituted or mono- to tri-substituted by Cl, F, $C_1$–$C_4$alkyl and/or by $C_1$–$C_4$alkoxy, or X is phenylene that is substituted by one or two groups (A) and that, in addition, may be mono- to tri-substituted by Cl, F, $C_1$–$C_4$alkyl and/or by $C_1$–$C_4$alkoxy, or X is a group of formula $A_{10}$–$A_{13}$

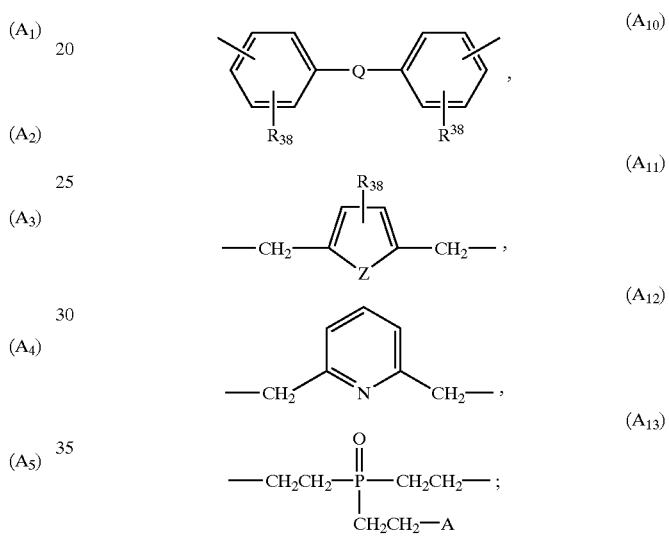

($A_{10}$), ($A_{11}$), ($A_{12}$), ($A_{13}$)

Q is a single bond, $CR_{39}R_{40}$, —O—, —S—, —$NR_{35}$—, —$SO_2$—, —$(CH_2)_p$— or —CH=CH—;
p is an integer from 2 to 12;
Z is O or S;
$R_{35}$ is hydrogen, $C_1$–$C_{12}$alkyl or phenyl;
$R_{36}$ is $C_1$–$C_4$alkyl or phenyl; and
$R_{37}$ is $C_1$–$C_{12}$alkyl, $C_2$–$C_{18}$alkyl interrupted one or more times by —O—, benzyl, phenyl, cyclopentyl or cyclohexyl;
$R_{38}$ is hydrogen, $C_1$–$C_4$alkyl, $C_1$–$C_4$alkoxy or halogen;
$R_{38}$ is hydrogen, methyl or ethyl; and
$R_{40}$ is hydrogen or $C_1$–$C_4$alkyl;
or component (C) is a mixture of a compound of formula I, Ia, Ib or II with a compound of formula III.

$C_1$–$C_{20}$Alkyl is linear or branched and is, for example, $C_1$–$C_{18}$-, $C_1$–$C_{12}$-, $C_1$–$C_8$-, $C_1$–$C_6$- or $C_1$–$C_4$-alkyl. Examples are methyl, ethyl, propyl, isopropyl, n-butyl, sec-butyl, isobutyl, tert-butyl, pentyl, hexyl, heptyl, 2,4,4-trimethyl-pentyl, 2-ethylhexyl, octyl, nonyl, decyl, undecyl, dodecyl, tetradecyl, heptadecyl, octadecyl and icosyl. $C_1$–$C_{18}$Alkyl, $C_1$–$C_{12}$alkyl, $C_1$–$C_8$alkyl and $C_1$–$C_4$alkyl are as defined hereinbefore up to the appropriate number of carbon atoms.

$C_2$–$C_{18}$Alkyl interrupted one or more times by —O— or by —S— is interrupted, for example, by —O— from one to five times, e.g. from one to three times or once or twice, resulting in, for example, structural units such as —$S(CH_2)_2OH$, —$O(CH_2)_2OH$, —$O(CH_2)_2OCH_3$, —$O(CH_2CH_2O)$ $_2CH_2CH_3$, $-CH_2-O-CH_3$, $-CH_2CH_2-O-CH_2CH_3$, $-[CH_2CH_2O]_y-CH_3$ wherein y=from 1 to 5, $-(CH_2CH_2O)_5CH_2CH_3$, $-CH_2-CH(CH_3)-O-CH_2-CH_2CH_3$ and $-CH_2-CH(CH_3)-O-CH_2-CH_3$.

$C_3-C_{12}$Cycloalkyl is, for example, cyclopropyl, cyclopentyl, cyclohexyl, cyclooctyl or cyclododecyl. $C_5-C_{12}$Cycloalkyl is, for example, cyclopentyl, cyclohexyl, cyclooctyl or cyclododecyl. Preference is given to cyclopentyl and cyclohexyl, especially cyclohexyl.

$C_1-C_{18}$Alkoxy is e.g. methoxy, ethoxy, n-propoxy, isopropoxy, n-butoxy, isobutoxy, sec-butoxy or tert-butoxy, pentyloxy, hexyloxy, heptyloxy, decyloxy or dodecyloxy, for example $C_1-C_{12}$alkoxy, $C_1-C_8$alkoxy, preferably $C_1-C_4$alkoxy, especially methoxy. $C_1-C_8$Alkoxy is as defined hereinbefore up to the appropriate number of carbon atoms.

$C_1-C_{12}$Alkylthio is linear or branched and is e.g. methylthio, ethylthio, n-propylthio, isopropylthio, n-butylthio, isobutylthio, sec-butylthio or tert-butylthio, pentylthio, hexylthio, heptylthio, decylthio or dodecylthio, for example $C_1-C_8$alkylthio, preferably $C_1-C_4$alkylthio, especially methylthio.

An O- or S-containing, 5- or 6-membered heterocyclic ring is, for example, furyl, thienyl, oxinyl or dioxinyl.

An O-, S- or N-containing, 5- or 6-membered heterocyclic ring is, for example, furyl, thienyl, pyrrolyl, pyridyl, oxinyl or dioxinyl.

$C_2-C_{12}$Alkenyl is, for example, allyl, methallyl, 1,1-dimethylallyl, butenyl, hexenyl, octenyl or dodecenyl, for example $C_2-C_8$alkenyl or $C_2-C_4$alkenyl, especially allyl. $C_2-C_4$Alkenyl is, for example, allyl, methallyl, 1,1-dimethylallyl or butenyl.

The radical $-O(CH_2CH_2O)_q-C_1-C_{16}$alkyl represents from 1 to 20 consecutive ethylene oxide units, the chain thereof being terminated by a $C_1-C_{16}$alkyl. q is preferably from 1 to 10, for example from 1 to 8, especially from 1 to 6. The chain of ethylene oxide units is terminated preferably by a $C_1-C_{10}$alkyl, for example by a $C_1-C_8$alkyl, especially by a $C_1-C_4$alkyl.

Phenyl-$C_1-C_4$alkyl is, for example, benzyl, phenylethyl, α-methylbenzyl or α,α-dimethylbenzyl, especially benzyl.

Substituted phenyl, naphthyl or biphenyl is mono- to penta-, for example, mono- to tetra-, e.g. mono-, di- or tri-, especially di- or tri-substituted.

$R_{31}$, $R_{32}$ and $R_{33}$ as substituted phenyl, naphthyl or biphenyl are substituted, for example, by linear or branched $C_1-C_8$alkyl, such as methyl, ethyl, n-propyl, isopropyl, n-butyl, isobutyl, sec-butyl, tert-butyl, pentyl, hexyl, heptyl or octyl, or by linear or branched $C_1-C_8$-alkoxy, such as methoxy, ethoxy, n-propoxy, isopropoxy, n-butoxy, isobutoxy, sec-butoxy, tert-butoxy, hexyloxy or octyloxy, or by linear or branched $C_1-C_8$alkylthio, such as methylthio, ethylthio, n-propylthio, isopropylthio, n-butylthio, isobutylthio, sec-butylthio, tert-butylthio, pentylthio or hexylthio, or by halogen, such as fluorine, chlorine, bromine or iodine. Preferred substituents of $R_{31}$, $R_{32}$ and $R_{33}$ as phenyl, naphthyl and biphenyl are $C_1-C_4$alkyl, especially methyl, $C_1-C_4$alkoxy, especially methoxy, and chlorine. $R_{31}$, $R_{32}$ and $R_{33}$ are especially, for example, 2,4,6-trimethylphenyl, 2,6-dichlorophenyl, 2,6dimethylphenyl or 2,6-dimethoxyphenyl.

Examples of n-valent metals (n=from 1 to 3) are Na, Li, K, Mg, Ca, Ba, Fe, Co and Al.

When $R_{31}$, and $R_{32}$ are $C_4-C_7$alkylene and, together with the P atom to which they are bonded, form a ring, that ring (including the P atom) is preferably five- or six-membered.

$C_1-C_8$Alkylphenyl is, for example, $C_1-C_4$alkylphenyl, for example tolyl, xylyl, mesityl, ethylphenyl or diethylphenyl, preferably tolyl or mesityl. $C_1-C_4$Alkylnaphthyl is naphthyl substituted by methyl, ethyl and/or propyl or butyl.

$C_1-C_{18}$alkylene and $C_1-C_{12}$alkylene are linear or branched alkylene, for example methylene, ethylene, propylene, isopropylene, n-butylene, sec-butylene, isobutylene, tert-butylene, pentylene, hexylene, heptylene, octylene, nonylene, decylene, dodecylene, tetradecylene, heptadecylene or octadecylene. X and Y are each especially $C_1-C_{12}$alkylene, for example ethylene, decylene, $-CH(C_{11}H_{23})-$, $-CH(CH_3)-CH_2-$, $-CH(CH_3)-(CH_2)_2-$, $-CH(CH_3)-(CH_2)_3-$, $-C(CH_3)_2-CH_2-$ or

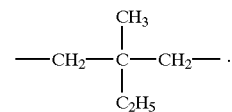

When X is $C_2-C_{18}$alkylene interrupted by $-O-$, $-S-$, $-NR_{35}-$, $-P(O)R_{36}-$or by $-SO_2-$, there are obtained, for example, structural units such as $-CH_2-O-CH_2-$, $-CH_2CH_2-O-CH_2CH_2-$, $-[CH_2CH_2O]_y-$ wherein y=from 1 to 9, $-(CH_2CH_2O)_7CH_2CH_2-$, $-CH_2-CH(CH_3)-O-CH_2-CH(CH_3)-$, $-CH_2-S-CH_2-$, $-CH_2CH_2-S-CH_2CH_2-$, $-CH_2-CH_2CH_2-S-CH_2CH_2CH_2-$, $-(CH_2)_3-S-(CH_2)_3-S-(CH_2)_3-$, $-CH_2-(NR_{35})-CH_2-$, $-CH_2CH_2-(NR_{35})-CH_2CH_2-$, $-CH_2-(P(O)R_{36})-CH_2-$, $-CH_2CH_2-(P(O)R_{36})-CH_2CH_2-$,

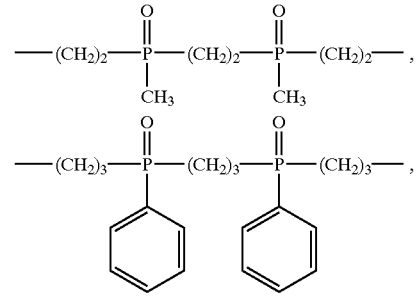

$-CH_2-SO_2-CH_2-$ and
$-CH_2CH_2-SO_2-CH_2CH_2-$.

$C_1-C_4$Alkoxy substituents are, for example, methoxy, ethoxy, propoxy and butoxy, especially methoxy. $C_1-C_6$alkylene substituted by $C_1-C_4$alkoxy or by $-COOR_{37}$ is, for example, $-CH(OCH_3)-$ or $-CH(COOCH_3)-CH_2-$. $C_1-C_4$Alkylphenyl is, for example, tolyl, xylyl, mesityl, ethylphenyl or diethylphenyl, preferably tolyl or mesityl. $C_1-C_4$Alkylnaphthyl is naphthyl substituted by methyl, ethyl and/or propyl or butyl. Phenyl-$C_1-C_4$alkyl is, for example, benzyl, phenylethyl, α-methylbenzyl or α,α-dimethylbenzyl, especially benzyl. Naphthyl-$C_1-C_4$alkyl is, for example, naphthylmethyl, naphthylethyl, naphthyl-(1-methyl)-eth-1-yl or naphthyl-(1,1-dimethyl)eth-1-yl, especially naphthylmethyl. Phenyl-$C_1-C_4$alkoxy is to be understood as being, for example, benzyloxy, phenylethyloxy, α-methylbenzyloxy or α,α-dimethylbenzyloxy, especially benzyloxy. Naphthyl-$C_1-C_4$alkoxy is, for example, naphthylmethyloxy or naphthylethyloxy.

Examples of groups of formula (A₁) wherein the sum of d and f is from 3 to 8 are:

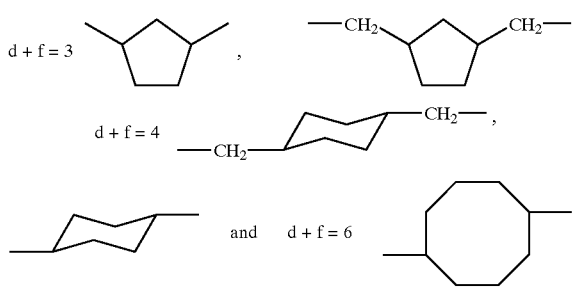

Preference is given to

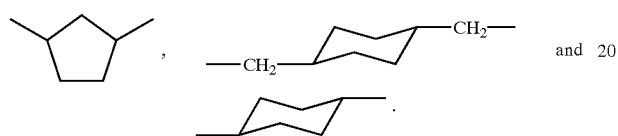

Examples of groups of formulae $A_2$, $A_3$, $A_4$, $A_5$, $A_6$, $A_7$, $A_8$ and $A_9$ are

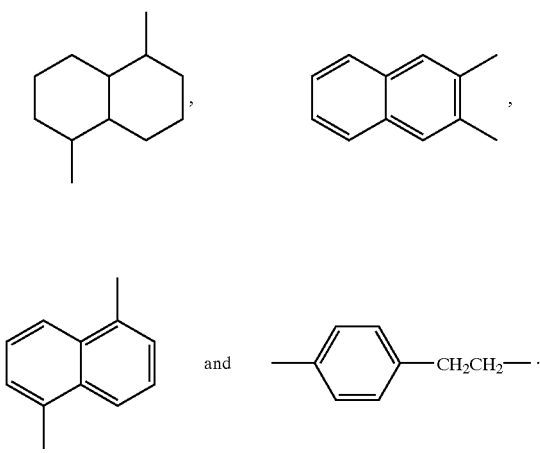

Examples of groups of formula $A_{10}$ are

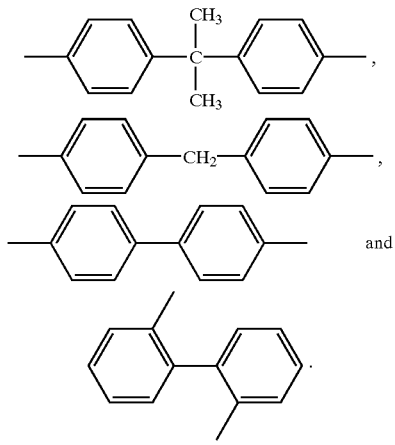

Examples of unsubstituted and substituted phenylene and xylylene are

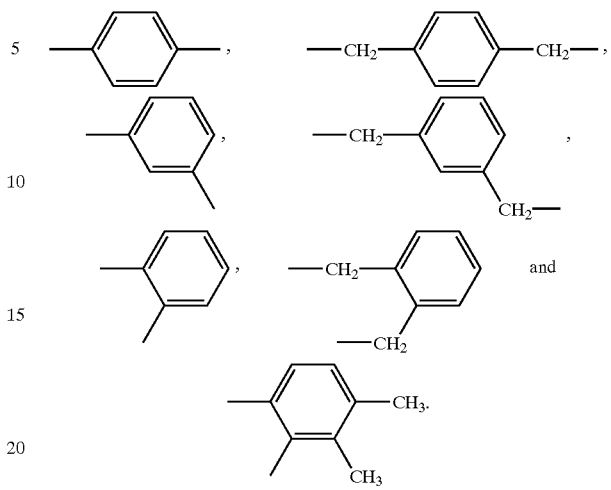

The preparation of compounds of formulae I and Ia is generally known and some of the compounds are available commercially. The preparation of oligomeric compounds of formula I is described, for example, in EP-A-161 463. A description of the preparation of compounds of formula Ia may be found, for example, in EP-A-209 831.

The preparation of compounds of formula Ib is described, for example, in EP-A-284 561. The compounds of formula III are prepared, for example, in the manner disclosed in EP-A-184 095. Some compounds of formulae Ib, II and III are also available commercially.

Preference is given to compounds of formula I wherein $R_1$ is hydrogen, $C_1$–$C_{12}$alkyl or —OCH₂CH₂—OR₅; $R_2$ and $R_3$ are each independently of the other $C_1$–$C_6$alkyl, phenyl or $C_1$–$C_{16}$alkoxy or $R_2$ and $R_3$, together with the carbon atom to which they are bonded, form a cyclohexyl ring; $R_4$ is hydroxy or $C_1$–$C_{16}$alkoxy; $R_5$ is hydrogen or

and to compounds of formula (Ia) wherein $R_9$, $R_{10}$, $R_{11}$ and $R_{12}$ are hydrogen; and to compounds of formula (Ib) wherein $R_{13}$ is hydrogen; $R_{14}$ is $C_1$–$C_4$alkylthio or $N(R_{17}R_{18})$; $R_{15}$ is $C_1$–$C_8$alkyl; $R_{16}$ is phenyl; $R_{17}$ and $R_{18}$ are each independently of the other $C_1$–$C_4$alkyl or $R_{17}$ and R18, together with the nitrogen atom to which they are bonded, form a saturated six-membered ring, which may be interrupted by —O—; and to compounds of formula II wherein $R_{21}$ is phenyl and $R_{22}$ is $C_1$–$C_{12}$alkyl; and to compounds of formula III wherein Z is O; $R_{31}$ and $R_{32}$ are each independently of the other $C_1$–$C_{18}$alkyl; phenyl that is unsubstituted or mono- to penta-substituted by $C_1$–$C_8$alkyl and/or by $C_1$–$C_8$-alkoxy; or a group $COR_{33}$; and $R_{33}$ is phenyl that is unsubstituted or mono- to tetra-substituted by $C_1$–$C_8$alkyl or by $C_1$–$C_8$alkoxy.

Preferably, $R_2$ and $R_3$ in formula I are each independently of the other $C_1$–$C_6$alkyl or, together with the carbon atom to which they are bonded, form a cyclohexyl ring, and $R_4$ is hydroxy.

More especially, $R_2$ and $R_3$ in formula I are identical and are each methyl, and $R_4$ is hydroxy or isopropoxy.

In formula Ia $R_9$–$R_{12}$ are preferably hydrogen.

Preferably, $R_{16}$ in formula Ib is phenyl or —CH=CHR₂₀, $R_{14}$ is $C_1$–$C_4$alkylthio or $N(R_{17})_2$, and $R_{15}$, $R_{17}$ and $R_{18}$ are $C_1$–$C_4$alkyl.

In formula II $R_{21}$ is preferably phenyl and $R_{22}$ is $C_1$–$C_4$alkyl.

Preferably, $R_{31}$ in formula III is $COR_{33}$ wherein $R_{33}$ is phenyl mono- to tetra-substituted by $C_1$–$C_4$alkyl, $C_1$–$C_4$alkoxy and/or by halogen, and $R_{32}$ is $C_1$–$C_{12}$alkyl, unsubstituted phenyl or phenyl mono- to penta-substituted by $C_1$–$C_4$alkyl and/or by $C_1$–$C_4$alkoxy.

Furthermore, in formula III preferably $R_{31}$ and $R_{32}$ are phenyl and $R_{33}$ is phenyl mono- to tri-substituted by $C_1$–$C_4$alkyl and/or by $C_1$–$C_4$alkoxy.

Z is preferably O.

As component (C) special preference is given to 1-hydroxy-cyclohexyl-phenyl ketone, 1-[4-(2-hydroxyethoxy)phenyl]-2-hydroxy-2-methyl-1-propan-1-one or 2-hydroxy-2-methyl-1-phenyl-propanone, (4-morpholino-benzoyl)-1-benzyl-1-dimethylamino-propane or (4-methylthiobenzoyl)-1-methyl-1-morpholino-ethane, 2,2-dimethoxy-1,2-diphenylethan-1-one, 2,4,6-trimethylbenzoyl-diphenyl-phosphine oxide, bis(2,6-dimethoxybenzoyl-2,4,4-trimethylpentyl-phosphine oxide, bis(2,4,6-trimethylbenzoyl)-(2-methylprop-1-yl)-phosphine oxide, bis(2,4,6-trimethylbenzoyl)-phenyl-phosphine oxide, and mixtures of bis(2,6-dimethoxybenzoyl)-2,4,4-trimethylpentyl-phosphine oxide with 1-hydroxy-cyclohexyl-phenyl ketone, hydroxy-2-methyl-1-phenyl-propanone or 2-methoxy-1-phenyl-ethane-1,2-dione; or of bis(2,4,6-trimethylbenzoyl)-phenyl-phosphine oxide with 1-hydroxy-cyclohexyl-phenyl ketone, hydroxy-2-methyl-1-phenyl-propanone or 2-methoxy-1-phenyl-ethane-1,2-dione; or of 2,4,6-trimethylbenzoyl-diphenyl-phosphine oxide with 1-hydroxy-cyclohexyl-phenyl ketone, hydroxy-2-methyl-1-phenyl-propanone or 2-methoxy-1-phenyl-ethane-1,2-dione.

The photopolymerisable compositions contain the photoinitiator (C) advantageously in an amount from 0.05 to 20% by weight, preferably from 2 to 10% by weight, based on 100 parts of component (A).

When the photoinitiator (C) is a mixture of a compound of formula I, Ia, Ib or II with a compound of formula III, the proportion of the compound(s) of formula I, Ia, Ib or II in the mixture is, for example, from 25 to 90%, e.g. from 25 to 75%, preferably from 50 to 75%.

Preference is given to a composition comprising (A) polyester polyol, acrylate polyol or hexamethoxymethylmelamine and (B) isocyanurate or OH-functionalised acrylate and (C) 1-hydroxy-cyclohexyl-phenyl ketone or 25% bis(2,6-dimethoxybenzoyl)-2,4,4-trimethylpentyl-phosphine oxide and 75% 1-hydroxy-cyclohexyl-phenyl ketone or 4-[(2-hydroxyethoxy)-benzoyl]-1-hydroxy-1-methyl-ethane.

It is characteristic of the composition that it comprises an OH—, $NH_2$—, COOH—, epoxy- or NCO-functionalised component that also, in addition, contains free double bonds separated from the functional group by a spacer group of at least 4 linearly linked atoms (B), and a photoinitiator (C). In accordance with the process according to the invention, the addition of those components allows a further cross-linking of the surface coating on irradiation with light after the thermal curing, resulting in a surface coating having improved surface properties, especially in respect of the hardness and resistance to scratching.

The surface coatings according to the invention may comprise an organic solvent or solvent mixture in which the binder and/or the cross-linker is (are) soluble or dispersible. The composition may, however, also be an aqueous solution or dispersion. It is also possible, for example, for one of the two components to serve as the dispersion medium or dissolution medium for the other component. The vehicle may also be a mixture of an organic solvent and water. The coating may also be a high-solids surface coating or may be solvent-free (for example, powder coating composition).

The compositions according to the invention are prepared by mixing all the components. It is also possible, for example, first to link only the OH—, $NH_2$—, COOH—, epoxy- or NCO-functionalised component (B) with component (A), or with a constituent thereof, via the functional group in question, and thereafter to mix in all the other constituents.

The compositions according to the invention may be applied to any desired substrates, for example to metal, wood, plastics or ceramic materials. They are preferably used as finishing lacquers for the surface-coating of motor vehicles. When the finishing lacquer consists of two layers the lower layer of which is pigmented and the upper layer of which is not pigmented, the coating according to the invention may be used for the upper or the lower layer or for both layers, but preferably for the upper layer.

The compositions according to the invention may be applied to the substrates in accordance with the customary procedures, for example by painting, spraying, pouring, immersion or electrophoresis; see also Ullmann's Encyclopedia of Industrial Chemistry, 5th Ed., Vol. A18, pp. 491–500.

The invention therefore relates also to a process for the coating of a substrate wherein a composition according to the invention is applied to the surface of the substrate, cured by means of heating and then irradiated with UV light.

In addition to the photoinitiator the compositions may comprise further customary additives, or it is possible to add further additives to the formulation in the process according to the invention. For example, the composition may comprise further components in addition to components. (A), (B) and (C), or in the process according to the invention it is possible to add to components (B) and (C) further additives, for example light stabilisers, solvents, pigments, dyes, plasticisers, stabilisers, thixotropic agents, drying catalysts and/or flow improvers. Possible components are, for example, such as are described in Ullmann's Encyclopedia of Industrial Chemistry, 5th Ed., Vol. A18, pp. 429–471, VCH, Weinheim 1991.

UV-absorbers, for example those of the hydroxyphenyl-benzotriazole, hydroxyphenyl-benzophenone, oxalic acid amide or hydroxyphenyl-s-triazine type, may be added as light stabilisers. There may be used, for example, individual compounds or mixtures of those compounds with or without the use of sterically hindered amines (HALS).

Possible drying catalysts, or curing catalysts, are, for example, organic metal compounds, amines, amino-group-containing resins and/or phosphines. Organic metal compounds are, for example, metal carboxylates, especially those of the metals Pb, Mn, Co, Zn, Zr and Cu, and metal chelates, especially those of the metals Al, Ti and Zr, and organometal compounds, for example organotin compounds. Examples of metal carboxylates are the stearates of Pb, Mn and Zn, the octanoates of Co, Zn and Cu, the naphthenates of Mn and Co and the corresponding linoleates, resinates and tallates.

Examples of metal chelates are the aluminium, titanium and zirconium chelates of acetyl-acetone, ethyl acetoacetate, salicylaldehyde, salicylaldoxime, o-hydroxyacetophenone and ethyltrifluoroacetoacetate and the alcoholates of those metals. Examples of organotin compounds are dibutyltin oxide, dibutyltin dilaurate and dibutyltin dioctanoate. Examples of amines are especially tertiary amines, for example tributylamine, triethanolamine, N-methyl-diethanolamine, N-dimethylethanolamine, N-ethylmorpholine, N-methyl-morpholine and diazabicyclooctane (triethylenediamine) and salts thereof. Further examples are quaternary ammonium salts, for example trimethylbenzylammonium chloride. Amino-group-containing resins act simultaneously as binder and curing catalyst. Amino-group-containing acrylate copolymers are examples thereof. As curing catalyst there may also be used phosphines, for example triphenyl-phosphine. The pigments may be inorganic, organic or metallic pigments. Preferably, the coatings according to the invention contain no pigments and are used as clear lacquer.

Preference is given to the use of the composition according to the invention as a coating, especially as a finishing lacquer for use in the furniture industry and automobile industry, more especially as a pigmented or non-pigmented top layer of the surface coating. The use thereof for underlying layers is, however, also possible. When the composition according to the invention is used in the underlying layer, with the simultaneous use of a UV-curable finishing lacquer, the adhesion of the UV-curable finishing lacquer to the underlying layer is improved as a result of the reaction of the double bonds present in each of the layers.

Preference is given to non-pigmented compositions and to a curing process without the addition of pigments.

The curing of the compositions according to the invention is carried out thermally at first. The surface is after-cured by subsequent irradiation with UV light. Accordingly, in the curing process according to the invention, the coating to be cross-linked is first of all cured by the action of heat and the surface hardness is improved by the subsequent irradiation with UV light.

The thermal curing is carried out generally in an oven, for example a circulating-air oven, or by means of irradiation with IR lamps. Curing at room temperature without aids is likewise possible, depending on the binder system used. The curing temperatures are generally from room temperature to 150° C., for example from 25 to 150° C. or from 50 to 150° C. In the case of powder coating compositions, the curing temperatures may be even higher, for example up to 250° C.

The photochemical curing step is carried out, usually using light of wavelengths from about 200 nm to about 600 nm, especially from 200 to 450 nm. As light sources there are used a large number of the most varied types. Both point sources and planiform projectors (lamp carpets) are suitable. Examples are: carbon arc lamps, xenon arc lamps, medium-, high- and low-pressure mercury lamps, optionally doped with metal halides (metal halide lamps), microwave-excited metal-vapour lamps, excimer lamps, superactinic fluorescent tubes, fluorescent lamps, argon filament lamps, electronic flash lamps, photographic flood lights, electron beams and X-rays generated by means of synchrotrons or laser plasma. The distance between the lamp and the substrate according to the invention to be irradiated may vary, for example, from 2 cm to 150 cm, according to the intended use and the type and strength of the lamp. Laser-light sources, for example excimer lasers, are especially suitable. The selection of the type of lamp is dependent especially on the type of photoinitiator (C) used. For example, bisacylphosphine oxide photoinitiators are excited even by lamps having an emission spectrum of relatively long wavelength.

The Examples that follow illustrate the invention further. Unless stated otherwise, parts or percentages relate, as they do in the rest of the description and in the patent claims, to weight.

EXAMPLES 1–4

A 2-component polyurethane clear lacquer is prepared by mixing:
  50.10 parts of Desmophen® 680; polyester polyol; 70% in butyl acetate (Bayer AG)
  0.48 part of Baysilone® OL 17; flow improver; 10% in xylene (Bayer AG)
  1.45 parts of diazabicyclooctane (DABCO); accelerator; 10% in butyl acetate
  14.64 parts of xylene/butyl acetate/Solvesso® 100 (2/2/1); (Solvesso®=aromatic hydro-carbons (Esso))
  14.76 parts of Desmodur® N 3390; isocyanurate; 90% (Bayer AG)
  18.57 parts of xylene/butyl acetate/Solvesso® 100 (2/2/1)
  100.00 parts of resin solid To a sample of the lacquer thus prepared there are added 10%, and to a further sample 15%, (based on the resin solid) Ebecryl® 600, OH-functional acrylate resin (UCB) and 5% photoinitiator (PI-1 or PI-2); the mixture is applied to a white coil-coating sheet, air-dried for 15 minutes and stoved at 80° C. for 30 minutes. A dry film thickness of approximately 40 μm is obtained. 10 minutes after the thermal curing, the pendulum hardness according to König (DIN 53157) is determined. Irradiation is then carried out using a UV-processor (2×120 W/cm) at a band speed of 10 m/min and the pendulum hardness is determined again. The higher the values of the pendulum hardness measurement, the more durable and harder is the cured surface. The initiators used and the results of the pendulum hardness measurements can be found in Table 1 below.

TABLE 1

| Example | OH-functional resin | Photo-initiator | Pendulum hardness [sec] | | |
|---|---|---|---|---|---|
| | | | before irradiation | after irradiation | increase |
| 1 | 10% | PI-1 | 29 | 41 | 12 |
| 2 | 10% | PI-2 | 34 | 47 | 13 |
| 3 | 15% | PI-1 | 31 | 46 | 15 |
| 4 | 15% | PI-2 | 34 | 53 | 19 |

PI-1: 1-Hydroxy-cyclohexyl-phenyl ketone (Irgacure ® 184; Ciba Spezialitätenchemie)
PI-2: 25% bis(2,6-dimethoxybenzoyl)-2,4,4-trimethylpentyl-phosphine oxide + 75% 1-hydroxy-cyclohexyl-phenyl ketone (Irgacure ® 1800; Ciba Spezialitätenchemie)

EXAMPLE 5

A high-solids clear lacquer is prepared by mixing:
  56.16 g of Joncryl® 510; OH-functional acrylate; 80% in xylene (SC Johnson Polymer BV/Holland)
  19.18 g of Cymel® 303; hexamethoxymethylmelamine (Cytec Industries/USA)
  14.16 g of butanol
  9.89 g of methylamyl ketone (MAK)
  0.61 g of DC-57; flow improver; 10% in MAK (DOW Corning/Belgium)
  100.00 g 0.5% p-toluenesulfonic acid (10% in butanol) is added to that mixture. To a sample of the lacquer thus prepared there are added 15% 8-hydroxyoctyl acrylate (HOAc) and to another sample 15% Tegomer® V-Si 2150 (α,ω-acryloxyorgano-functional polydimethylsiloxane, Goldschmidt AG/Germany), and to each of two further samples there are added, in addition, 6% 4-[(2-hydroxyethoxy)-benzoyl]-1-hydroxy-1-methyl-ethane (Irgacure® 2959, Ciba Spezialitätenchemie/Switzerland) which has been dissolved beforehand in methyl ethyl ketone. The samples are each applied to a white coil-coating sheet, air-dried for 15 minutes and stoved at 120° C. for 30 minutes. A dry film thickness of approximately 45 μm is obtained. After the thermal curing, the sample sheets are cooled to 50° C. and irradiated using a UV-processor (2×81 W/cm) at a band speed of 5 m/min. The pendulum hardness according to König (DIN 53157) is determined before and after irradiation. The results of the pendulum hardness measurements are shown in Table 2.

TABLE 2

| Photoinitiator | Pendulum hardness [sec] | | |
|---|---|---|---|
| Resin | before irradiation | after irradiation | Increase |
| Without photoinitiator HOAc | 57 | 64 | 7 |
| Without photoinitiator Tegomer | 59 | 57 | −2 |
| With photoinitiator HOAc | 53 | 95 | 42 |
| With photoinitiator Tegomer | 95 | 113 | 18 |

A clear increase in the pendulum hardness is observed in the case of the samples to which photoinitiator has been added.

EXAMPLE 6

A high-solids clear lacquer is prepared by mixing:

53.4 g of Joncryl® 510; OH-functional acrylate; 80% in xylene (SC Johnson Polymer BV/Holland)

19.18 g of Cymel® 303; hexamethoxymethylmelamine (Cytec Industries/USA)

14.16 g of butanol 12.65 g of methylamyl ketone (MAK)

0.61 g of DC-57; flow improver; 10% in MAK (DOW Corning/Belgium)

100.00 g 0.5% p-toluenesulfonic acid (10% in butanol) is added to that mixture. To a sample of the lacquer thus prepared there are added 15% 8-hydroxyoctyl acrylate (HOAc) and to another sample 15% Tegomer® V-Si 2150 (α,ω-acryloxyorgano-functional polydimethylsiloxane, Goldschmidt AG/Germany), and to each of two further samples there are added, in addition, 6% 4-[(2-hydroxyethoxy)-benzoyl]-1-hydroxy-1-methyl-ethane (Irgacure® 2959, Ciba Spezialitätenchemie/Switzerland) which has been dissolved beforehand in methyl ethyl ketone. The samples are each applied to a white coil-coating sheet, air-dried for 15 minutes and stoved at 120° C. for 30 minutes. A dry film thickness of approximately 45 μm is obtained. After the thermal curing, the sample sheets are cooled to 50° C. and irradiated using a UV-processor (2×81 W/cm) at a band speed of 5 m/min. The pendulum hardness according to König (DIN 53157) is determined before and after irradiation. The results of the pendulum hardness measurements are listed in Table 3.

TABLE 3

| Photoinitiator | Pendulum hardness [sec] | | |
|---|---|---|---|
| Resin | before irradiation | after irradiation | Increase |
| Without photoinitiator HOAc | 53 | 57 | 4 |

TABLE 3-continued

| Photoinitiator | Pendulum hardness [sec] | | |
|---|---|---|---|
| Resin | before irradiation | after irradiation | Increase |
| Without photoinitiator Tegomer | 69 | 80 | 11 |
| With photoinitiator HOAc | 69 | 102 | 43 |
| With photoinitiator Tegomer | 63 | 95 | 32 |

EXAMPLE 7

To a sample of a 2C polyurethane lacquer mixture, as described in Example 1, there are added 15% 8-hydroxyoctyl acrylate (HOAc) and to another sample 15% 4-hydroxybutyl acrylate (HBAc), and to each of two further samples there are added, in addition, 6% 4-[(2-hydroxyethoxy)-benzoyl]-1-hydroxy-1-methyl-ethane (Irgacure® 2959, Ciba Spezialitäten-chemie/Switzerland) which has been dissolved beforehand in methyl ethyl ketone. The samples are each applied to a white coil-coating sheet, air-dried for 15 minutes and stoved at 80° C. for 30 minutes. A dry film thickness of approximately 45 μm is obtained. After the thermal curing, the sample sheets are cooled to 50° C. and irradiated using a UV-processor (2×81 W/cm) at a band speed of 5 m/min. The MEK-resistance is determined before and after irradiation. For that purpose, a piece of felt soaked with methyl ethyl ketone is laid on the lacquer surface and covered with a watch glass; the time until blister formation is measured. The longer the time period until blister formation, the more resistant is the surface-coating formulation. The results can be found in Table 4.

TABLE 4

| Photoinitiator | MEK-resistance [min] | | |
|---|---|---|---|
| Resin | before irradiation | after irradiation | Increase |
| Without photoinitiator HOAc | 2 | 2 | 0 |
| Without photoinitiator HBAc | 2 | 2 | 0 |
| With photoinitiator HOAc | 2 | 25 | 23 |
| With photoinitiator HBAc | 2 | 15 | 13 |

The improvement in the resistance to solvent when a photoinitiator has been added for the subsequent irradiation is clearly discernible.

EXAMPLE 8

A 2C polyurethane lacquer is prepared by mixing:

54.80 g of Macrynal® SM 510N; acrylate polyol (Hoechst/Germany)

0.15 g of Byk® 300; flow improver (Byk-Chemie/Germany)

0.07 g of Nuodex zinc octanoate; accelerator 11.50 g of butyl glycol acetate 4.70 g of Solvesso 100; aromatic hydrocarbons (Esso)

5.68 g of methyl isobutyl ketone (MIBK)

23.10 g of Desmodur® N75; isocyanate (Bayer AG/Germany)

100.00 g

To a sample of the lacquer thus prepared there are added 15% 8-hydroxyoctyl acrylate (HOAc) and to a further sample there are added, in addition, 6% 4-[(2-hydroxyethoxy)-benzoyl]-1-hydroxy-1-methyl-ethane (Irgacure® 2959, Ciba Spezialitätenchemie/Switzerland) which has been dissolved beforehand in methyl ethyl ketone. The samples are each applied to a white coil-coating sheet, air-dried for 15 minutes and stoved at 130° C. for 30 minutes. A dry film thickness of approximately 45 μm is obtained. After the thermal curing, the sample sheets are cooled to 50° C. and irradiated using a UV-processor (2×81 W/cm) at a band speed of 5 m/min. The pendulum hardness according to König (DIN 53157) is determined before and after irradiation. The results of the pendulum hardness measurements are reproduced in Table 5.

TABLE 5

| Photoinitiator | Pendulum hardness [sec] | | |
|---|---|---|---|
| Resin | before irradiation | after irradiation | Increase |
| Without photoinitiator HOAc | 118 | 120 | 2 |
| With photoinitiator HOAc | 120 | 140 | 20 |

What is claimed is:

1. A process for the curing of a polymerizable composition comprising (A) a coating system comprising the following combination of components (I) or (II) or (III) or mixtures thereof, wherein
   (I) is a polyacrylate polyol and/or polyester polyol in admixture with melamine, a melamine resin or hexamethoxymethylmelamine,
   (II) is a polyacrylate polyol and/or polyester polyol in admixture with a blocked or unblocked polyisocyanate, and
   (III) is a carboxyl-, anhydride- or amino-functional polyester and/or polyacrylate in admixture with an epoxy-functional polyester or polyacrylate; and (B) a monomeric or oligomeric compound having at least one ethylenically unsaturated double bond and in addition containing one or more OH-groups, or one or more NH$_2$-groups, or one or more COOH-groups, or one or more epoxy-groups or one or more NCO-groups, it being necessary for a spacer group of at least 4 linearly linked atoms to be present between the double bond and the functional group, wherein components (A) and (B) do not contain halogen, and (C) at least one photoinitiator that is capable of initiating radical polymerization, that comprises the steps of applying the coating system onto a substrate, subjecting the coating system to thermal treatment and, for the purpose of improving the surface properties, subsequently subjecting the coating system to photochemical treatment with light of a wavelength from 200 to 600 nm.

2. A process according to claim 1 wherein in the composition the photoinitiator (C) is a compound of formula I

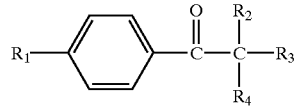

wherein $R_1$ is hydrogen, $C_1-C_{18}$alkyl, $C_1-C_{18}$alkoxy, —OCH$_2$CH$_2$—OR$_5$, a group

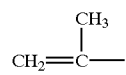

or a group

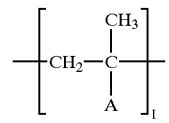

wherein

I is an integer from 2 to 10 and

A is a radical

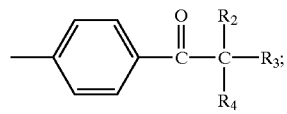

$R_2$ and $R_3$ are each independently of the other hydrogen, $C_1-C_6$alkyl, phenyl, $C_1-C_{16}$alkoxy, OSiR$_6$R$_7$R$_8$ or —O(CH$_2$CH$_2$O)$_q$—C$_1$-C$_{16}$alkyl wherein q is an integer from 1 to 20, or $R_2$ and $R_3$, together with the carbon atom to which they are bonded, form a cyclohexyl ring;

$R_4$ is hydroxy, $C_1-C_{16}$alkoxy or —O(CH$_2$CH$_2$O)$_q$—C$_1$-C$_{16}$alkyl;

with the proviso that $R_2$, $R_3$ and $R_4$ are not all simultaneously $C_1-C_{16}$alkoxy or —O(CH$_2$CH$_2$O)$_q$—C$_1$-C$_{16}$alkyl;

$R_5$ is hydrogen, $C_1-C_8$alkyl,

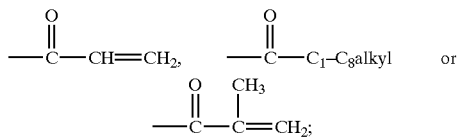

$R_6$, $R_7$ and $R_8$ are each independently of the others $C_1-C_4$alkyl or phenyl;

or a compound of formula (Ia)

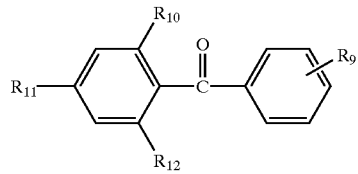

wherein
$R_9, R_{10}, R_{11}$ and $R_{12}$ are each independently of the others hydrogen, methyl, phenyl, methoxy, —COOH, unsubstituted or $C_1$–$C_4$alkyl-substituted phenyl, or a group —OCH$_2$CH$_2$OR$_5$ or —SCH$_2$CH$_2$OR$_5$ wherein
$R_5$ is as defined for formula I;
or a compound of formula (Ib)

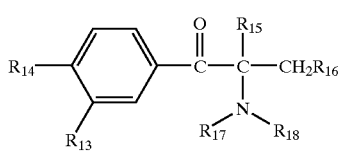

wherein
$R_{13}$ is hydrogen, $C_1$–$C_4$alkyl, $C_1$–$C_4$alkoxy, $C_1$–$C_4$alkylthio, halogen or a group $N(R_{17}R_{18})$;
$R_{14}$ has one of the meanings indicated for $R_{13}$ or is the group

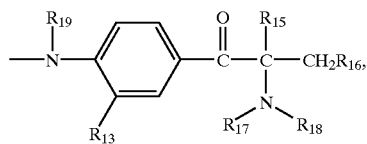

in which case the radical $R_{13}$ from formula Ib and the radical $R_{13}$ from this group are together a direct bond and the other radicals are as defined below;
$R_{15}$ is $C_1$–$C_8$alkyl;
$R_{16}$ is hydrogen, —CH=CHR$_{20}$, or phenyl that is unsubstituted or mono- to tri-substituted by $C_1$–$C_{12}$alkyl, $C_1$–$C_4$alkoxy or by halogen; or
$R_{15}$ and $R_{16}$, together with the carbon atom to which they are bonded, form a cyclohexyl ring;
$R_{17}$ and $R_{18}$ are each independently of the other $C_1$–$C_4$alkyl or
$R_{17}$ and $R_{18}$, together with the nitrogen atom to which they are bonded, form a five- or six-membered, saturated or unsaturated ring, which may be interrupted by —O—, —NH— or by —N(CH$_3$)—;
$R_{19}$ is hydrogen or $C_1$–$C_{12}$alkyl; and
$R_{20}$ is hydrogen or $C_1$–$C_4$alkyl;
or a compound of formula II

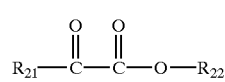

wherein
$R_{21}$ is naphthyl, anthracyl, an O- or S-containing, 5- or 6-membered heterocyclic ring or a group

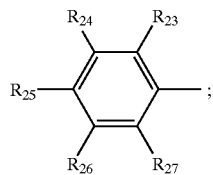

$R_{22}$ is $C_1$–$C_{12}$alkyl, cyclohexyl, cyclopentyl, $C_2$–$C_{12}$alkenyl, phenyl-$C_1$–$C_4$alkyl; phenyl, bi-phenyl or naphthyl each of which is unsubstituted or mono- to tetra-substituted by $C_1$–$C_4$alkyl and/or by $C_1$–$C_4$alkoxy; $C_2$–$C_{18}$alkyl interrupted one or more times by —O—; or Si($R_{28}$)($R_{29}$)($R_{30}$);
$R_{23}$, $R_{24}$, $R_{25}$, $R_{26}$ and $R_{27}$ are each independently of the others hydrogen, $C_1$–$C_8$alkyl, $C_1$–$C_8$alkoxy, $C_1$–$C_8$alkylthio, phenyloxy, phenylthio, phenyl that is unsubstituted or mono- to tetra-substituted by $C_1$–$C_4$alkyl and/or by $C_1$–$C_4$alkoxy, phenyl-$C_1$–$C_4$alkyl, halogen or NO$_2$;
$R_{28}$, $R_{29}$ and $R_{30}$ are each independently of the others $C_1$–$C_8$alkyl, cyclohexyl, cyclopentyl, phenyl or $C_1$–$C_8$alkoxy;
or a compound of formula III

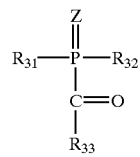

wherein
Z is S or O;
$R_{31}$ and $R_{32}$ are each independently of the other $C_1$–$C_{18}$alkyl, $C_2$–$C_{18}$alkyl interrupted one or more times by —O—, phenyl-substituted $C_1$–$C_4$alkyl, $C_2$–$C_4$alkenyl; phenyl, naphthyl or biphenyl each of which is unsubstituted or mono- to penta-substituted by halogen, hydroxy, $C_1$–$C_8$alkyl and/or by $C_1$–$C_8$alkoxy; $C_5$–$C_{12}$cycloalkyl, an O-, S- or N-containing, 5- or 6-membered heterocyclic ring, or a group COR$_{33}$, or
$R_{31}$ is a radical

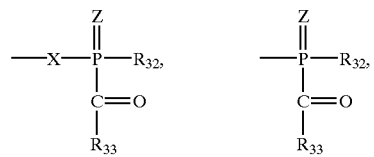

OH, OR$_{34}$, O$^-$NH$_4^+$ or O$^-$[M$^{n+}$]$_{1/n}$ wherein
n is an integer from 1 to 3 and
M is an n-valent metal ion, or
$R_{31}$ and $R_{32}$ together are $C_4$–$C_7$alkylene and form a ring together with the P atom to which they are bonded;
$R_{33}$ is $C_1$–$C_{18}$alkyl, $C_3$–$C_{12}$cycloalkyl, $C_2$–$C_{18}$alkenyl; phenyl, naphthyl or biphenyl each of which is unsubstituted or mono- to tetra-substituted by $C_1$–$C_8$alkyl, $C_1$–$C_8$alkoxy, $C_1$–$C_8$alkylthio and/or by halogen; an O-, S- or N-containing 5- or 6-membered heterocyclic ring, or a group

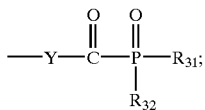

$R_{34}$ is $C_1$–$C_8$alkyl, phenyl, naphthyl, $C_1$–$C_8$alkylphenyl or $C_1$–$C_4$alkylnaphthyl;

Y is phenylene, $C_1$–$C_{12}$alkylene or $C_5$–$C_6$cycloalkylene;

X is $C_1$–$C_{18}$alkylene, $C_2$–$C_{18}$alkylene interrupted one or more times by —O—, —S—, —NR$_{35}$—, P(O)R$_{36}$— or by —SO$_2$—, or $C_1$–$C_6$alkylene substituted by Cl, F, $C_1$–$C_4$alkoxy, COOR$_{37}$, phenyl, phenyl-$C_1$–$C_4$alkyl, naphthyl-$C_1$–$C_4$alkyl, $C_1$–$C_4$alkylphenyl, $C_1$–$C_4$alkylnaphthyl, phenyl-$C_1$–$C_4$alkoxy, naphthyl-$C_1$–$C_4$alkoxy and/or by CN, or X is $C_1$–$C_8$alkylene substituted by one or two radicals of formula A

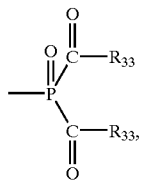

or

X is a group of formula $A_1$–$A_9$

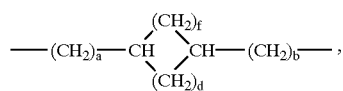

(A$_1$)

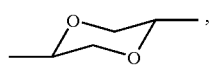

(A$_2$)

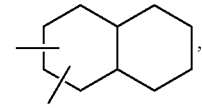

(A$_3$)

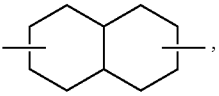

(A$_4$)

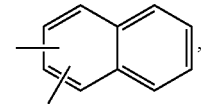

(A$_5$)

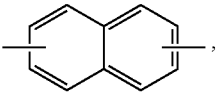

(A$_6$)

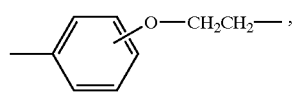

(A$_7$)

-continued

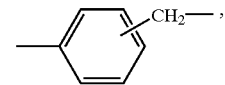

(A$_8$)

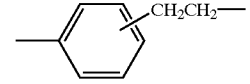

(A$_9$)

wherein a and b are each independently of the other 0 or 1, and the sum of d and f is an integer from 3 to 8, with the proviso that neither d nor f is 0, or X is a group —CH$_2$—CH=CH—CH$_2$— or —CH$_2$—C≡C—CH$_2$—, or X is phenylene, xylylene

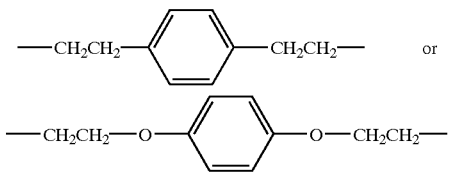

each of which is ununsubstituted or mono- to tri-substituted by Cl, F, $C_1$–$C_4$alkyl and/or by $C_1$–$C_4$alkoxy, or X is phenylene that is substituted by one or two groups (A) and that, in addition, may be mono- to tri-substituted by Cl, F, $C_1$–$C_4$alkyl and/or by $C_1$–$C_4$alkoxy, or X is a group of formula $A_{10}$–$A_{13}$

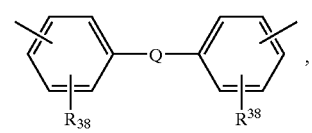

(A$_{10}$)

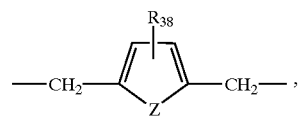

(A$_{11}$)

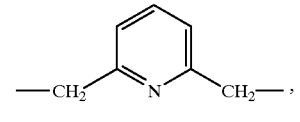

(A$_{12}$)

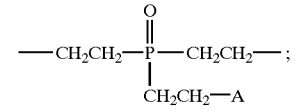

(A$_{13}$)

Q is a single bond, CR$_{39}$R$_{40}$, —O—, —S—, —NR$_{35}$—, —SO$_2$—, —(CH$_2$)$_p$— or —CH=CH—;

p is an integer from 2 to 12;

Z is O or S;

$R_{35}$ is hydrogen, $C_1$–$C_{12}$alkyl or phenyl;

$R_{36}$ is $C_1$–$C_4$alkyl or phenyl; and $R_{37}$ is $C_1$–$C_{12}$alkyl, $C_2$–$C_{18}$alkyl interrupted one or more times by —O—, benzyl, phenyl, cyclopentyl or cyclohexyl;

$R_{38}$ is hydrogen, $C_1$–$C_4$alkyl, $C_1$–$C_4$alkoxy or halogen;

$R_{39}$ is hydrogen, methyl or ethyl; and $R_{40}$ is hydrogen or $C_1$–$C_4$alkyl;

or a mixture of a compound of formula I, Ia, Ib or II with a compound of formula III.

3. A process according to claim 1 wherein in the composition in formula I $R_1$ is hydrogen, $C_1$–$C_{12}$alkyl or —$OCH_2CH_2$—$OR_5$; $R_2$ and $R_3$ are each independently of the other $C_1$–$C_6$alkyl, phenyl or $C_1$–$C_{16}$alkoxy or $R_2$ and $R_3$, together with the carbon atom to which they are bonded, form a cyclohexyl ring;

$R_4$ is hydroxy or $C_1$–$C_{16}$alkoxy; $R_5$ is hydrogen or

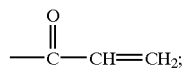

and wherein in formula (Ia) $R_9$, $R_{10}$, $R_{11}$ and $R_{12}$ are hydrogen;

and in formula (Ib)

$R_{13}$ is hydrogen; $R_{14}$ is $C_1$–$C_4$alkylthio or $N(R_{17}R_{18})$; $R_{15}$ is $C_1$–$C_8$alkyl;

$R_{16}$ is phenyl; $R_{17}$ and $R_{18}$ are each independently of the other $C_1$–$C_4$alkyl or $R_{17}$ and $R_{18}$, together with the nitrogen atom to which they are bonded, form a saturated six-membered ring, which may be interrupted by —O—;

wherein in formula II $R_{21}$ is phenyl and $R_{22}$ is $C_1$–$C_{12}$alkyl;

and wherein in formula III

Z is O; $R_{31}$ and $R_{32}$ are each independently of the other $C_1$–$C_{18}$alkyl, phenyl that is unsubstituted or mono- to penta-substituted by $C_1$–$C_8$alkyl and/or by $C_1$–$C_8$alkoxy, or a group $COR_{33}$; and $R_{33}$ is phenyl that is unsubstituted or mono- to tetra-substituted by $C_1$–$C_8$alkyl or by $C_1$–$C_8$alkoxy.

4. A process according to claim 1, wherein in the composition the photoinitiator (C) is selected from the group consisting of 1-hydroxy-cyclohexyl-phenyl ketone, 1-[4-(2-hydroxyethoxy)phenyl]-2-hydroxy-2-methyl-1-propan-1-one, 2-hydroxy-2-methyl-1-phenyl-propanone, (4-morpholino-benzoyl)-1-benzyl-1-dimethylamino-propane, (4-methylthiobenzoyl)-1-methyl-1-morpholino-ethane, 2,2-dimethoxy-1,2-diphenylethan-1-one, 2,4,6-trimethylbenzoyl-diphenyl-phosphine oxide, bis(2,6-dimethoxybenzoyl)-2,4,4-trimethylpentyl-phosphine oxide, bis(2,4,6-trimethyl-benzoyl)-(2-methylprop-1-yl)-phosphine oxide, bis(2,4,6-trimethylbenzoyl)-phenyl-phosphine oxide, hydroxy-2-methyl-1-phenyl-propanone, 2-methoxy-1-phenyl-ethane-1,2-dione, and mixtures thereof.

5. A process according to claim 1, wherein the spacer group in component (B) is a group

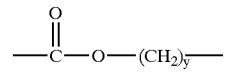

wherein $y \geq 2$.

6. A process according to claim 1, wherein the composition contains from 0.05 to 20%, photoinitiator (C), based on 100 parts of component (A).

7. A process according to claim 1, wherein the composition contains from 1 to 50%, component (B), based on 100 parts of component (A).

\* \* \* \* \*